(12) United States Patent
Palkki et al.

(10) Patent No.: US 6,266,516 B1
(45) Date of Patent: Jul. 24, 2001

(54) AUDIO DIAPHRAGM MOUNTING ARRANGEMENTS IN RADIO TELEPHONE HANDSETS

(75) Inventors: Mikko Palkki; Jussi Yli-Ayho; Guy Nicholson, all of Tampere (FI)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/268,082

(22) Filed: Mar. 12, 1999

(30) Foreign Application Priority Data

Mar. 18, 1998 (GB) .................................. 9805794

(51) Int. Cl.[7] .................................. H04B 1/38
(52) U.S. Cl. .................. 455/90; 455/350; 379/433; 381/398; 381/423
(58) Field of Search .................. 455/90, 568, 569, 455/570, 347, 350, 575; 379/428, 429, 431, 432, 433, 434; 381/386, 398, 423

(56) References Cited

U.S. PATENT DOCUMENTS

| | | | |
|---|---|---|---|
| 4,163,875 | 8/1979 | Cogan | 179/103 |
| 5,191,602 | * 3/1993 | Regen et al. | 455/568 |
| 5,210,793 | * 5/1993 | Carlson et al. | 379/433 |
| 5,313,661 | 5/1994 | Malmi et al. | 455/232.1 |
| 5,517,574 | * 5/1996 | Tichy | 381/386 |
| 5,613,222 | * 3/1997 | Guenther | 455/90 |
| 5,699,439 | * 12/1997 | Geisenberger et al. | 381/423 |
| 5,742,733 | 4/1998 | Jarvinen | 395/2.29 |
| 5,836,790 | 11/1998 | Barnett | 439/620 |

FOREIGN PATENT DOCUMENTS

| | | |
|---|---|---|
| 0166198 | 1/1986 | (EP) . |
| 611558 | 11/1948 | (GB) . |
| 2002201 | 2/1979 | (GB) . |
| WO 97/31468 | 8/1997 | (WO) . |

OTHER PUBLICATIONS

Untied Kingdom Search Report.

* cited by examiner

*Primary Examiner*—Nay Maung
*Assistant Examiner*—Quochien B. Vuong
(74) *Attorney, Agent, or Firm*—Perman & Green, LLP

(57) ABSTRACT

A radio telephone handset including a housing for retaining an audio diaphragm means, the housing having an aperture therein for receiving the diaphragm means, the diaphragm co-operating with the housing to define a substantially sealed chamber, the arrangement being such that an inward face of the audio diaphragm means is enclosed by the substantially sealed chamber and is thereby substantially acoustically isolated from a outward face of the diaphragm.

10 Claims, 3 Drawing Sheets

AUDIO DIAPHRAGM MOUNTING ARRANGEMENTS IN RADIO TELEPHONE HANDSETS

BACKGROUND OF THE INVENTION

The present invention generally relates to an audio diaphragm for a radio telephone handset, and more particularly is concerned with how such an audio diaphragm can be mounted in a radio telephone handset.

Inside an average radio telephone handset there can usually be found several audio transducers incorporating audio diaphragms. Typically, the handset has a microphone, an ear piece/speaker transducer and a ringer. In a microphone the diaphragm is modulated by sound, whilst in a speaker transducer the diaphragm is sound modulating. Optionally the handset may be provided with additional audio transducers for facilitating other audio functions such as hands-free telephoning.

To date, in known radio telephone handsets, audio diaphragms are mounted in one of a number different ways. Common methods of mounting the diaphragm include attaching it directly to the front or back cover of the handset or supporting it on an internal assembly plate carrying other components of the handset. To give one example, in one known type of handset, a speaker diaphragm is attached to an internal chassis which is bounded by a printed circuit board.

Although existing mounting techniques are perfunctory in holding an audio diaphragm in place, all three basic arrangements outlined above share a number of common problems. One of the main problems is that of sound attenuation. Taking, for the purpose of explanation, a handset speaker diaphragm, for example for hands-free usage. As is known, a speaker diaphragm, in response to an electrical signal, produces sound waves which propagate simultaneously in forward and rearward directions substantially in opposite phases. Owing for example to internal reflections of the sound waves occurring in the handset, sound waves having opposing phases are caused to meet one another leading to some destructive interference taking place between the forward sound waves and the rearward sound waves, thus resulting in sound cancellation. The overall effect is a reduction in the output sound pressure level, as well as frequency response change. Given the restricted surroundings of a radio telephone handset, and the comparatively low operating frequency of handset speaker diaphragms, the problems of sound cancellation are particularly marked.

Staying with the example of handset speaker diaphragms, a further problem is that, with different designs of handsets having different structures, the frequency response and performance characteristics of a speaker are not found to be uniform across a range of handsets. This can be attributed in particular to internal dimensions which allow standing waves to occur causing dips in the acoustic response of the handset speaker. Consequently, the variation in the performance of the speaker is an added factor which must be taken into consideration at the design stage; otherwise there is a risk of sub-optimal speaker performance.

In addition to a deterioration in the actual sound quality of a handset speaker diaphragm, these acoustic losses inevitably lead the handset speaker to draw more power from the radio telephone battery in order to meet a given sound output requirement. In radio telephone handsets, where power efficiency is the key to battery life—and hence usefulness of the telephone—the cumulative effect of the problems of existing mounting techniques can be acute. Also, the handset speaker may cause more audible distortion as a result of the increased power.

Against this background, the present invention seeks to address the shortcomings of known arrangements for mounting an audio diaphragm/transducer in a radio telephone handset.

SUMMARY OF THE INVENTION

Accordingly, the present invention resides in a radio telephone handset including a housing for retaining an audio diaphragm means, the housing having an aperture therein for receiving the audio diaphragm means, the retained audio diaphragm means co-operating with the housing to define a substantially sealed chamber, the arrangement being such that an inward face of the audio diaphragm means is enclosed by the substantially sealed chamber and is thereby substantially acoustically isolated from a outward face of the audio diaphragm means.

By containing the inward face of the audio diaphragm in the sealed chamber of the housing, audio signals associated with the rear of the audio diaphragm means are not exposed to audio signals associated with the front of the audio diaphragm means, thereby preventing respective audio signals from meeting, and hence substantially reducing sound wave cancellation.

Furthermore, because the volume of air enclosed in the housing is determined by its dimensions, the rear air loading can be calculated and carefully controlled so as to prevent acoustical standing waves from forming. The introduction of this design invariance ensures that the frequency response of the audio diaphragm means can be readily predicted.

As a result of the invention, not only is the quality of the audio output of the radio telephone handset significantly enhanced, but also its performance is optimised, and overall, the audio diaphragm means draws less battery power.

It will be understood that the audio diaphragm means can include a transducer incorporating an audio diaphragm and carrying other components such as contact pads etc.

In a preferred embodiment, the housing is provided with two apertures on oppositely facing walls of the housing for retaining two audio diaphragms. This arrangement has the added advantage of providing a compact holder for two audio diaphragms; the mutual acoustic interference between the two diaphragms being substantially reduced. Of course if needed, provision for retaining several audio diaphragms can be included in the one housing, and depending on the application requirements, the apertures can be provided in any surface of the housing.

The housing may be a unitary component which affords the housing a modular construction. This modularity facilitates simplified assembly of the handset, consequently improving production efficiency.

It is convenient to provide the housing with formations for engaging with other components of the handset. In particular, there may be electrical connectors in the form of pressed metal contacts for connecting the audio diaphragm means to a printed circuit board. Also other kinds of methods can be used, e.g. elastic and conductive material (elastomer) for allowing electrical connection from the housing to the handset. Such connectors enable quick but reliable electrical connections to be made to the audio diaphragm means.

BRIEF DESCRIPTION OF THE DRAWINGS

In order that the invention may be more readily understood, an embodiment thereof will now be described, by way of example, with reference to the accompanying drawings in which.

DETAILED DESCRIPTION OF THE INVENTION

Figure 1:
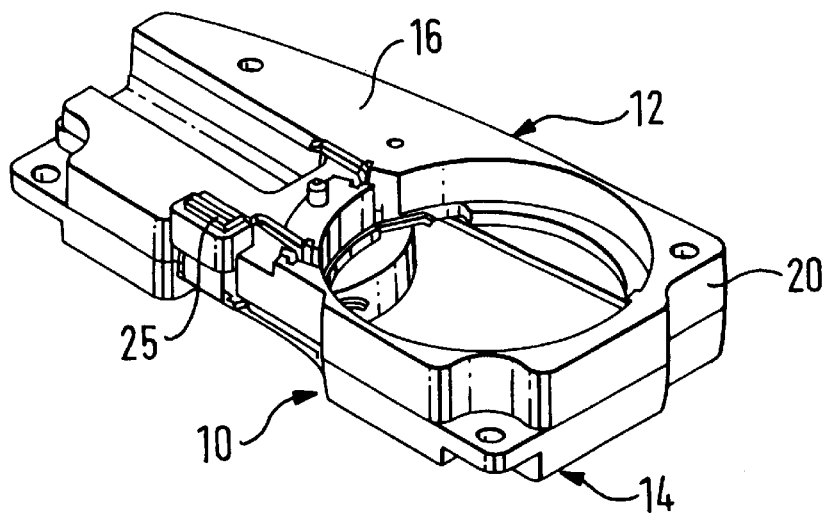
FIG. 1 is an isometric view of a housing of the present invention.

Referring initially to FIG. 1, there is shown a preferred embodiment of a housing (10) of the present invention. In this embodiment the housing (10) is made up of an upper diaphragm holder (12) and a lower diaphragm holder (14).

Figure 2:
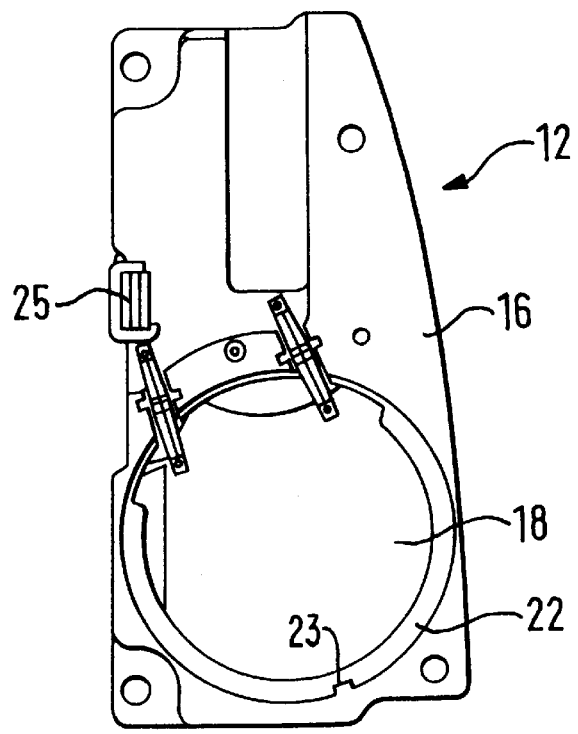
FIG. 2 is a top plan view of the housing of FIG. 1.
Figure 3:
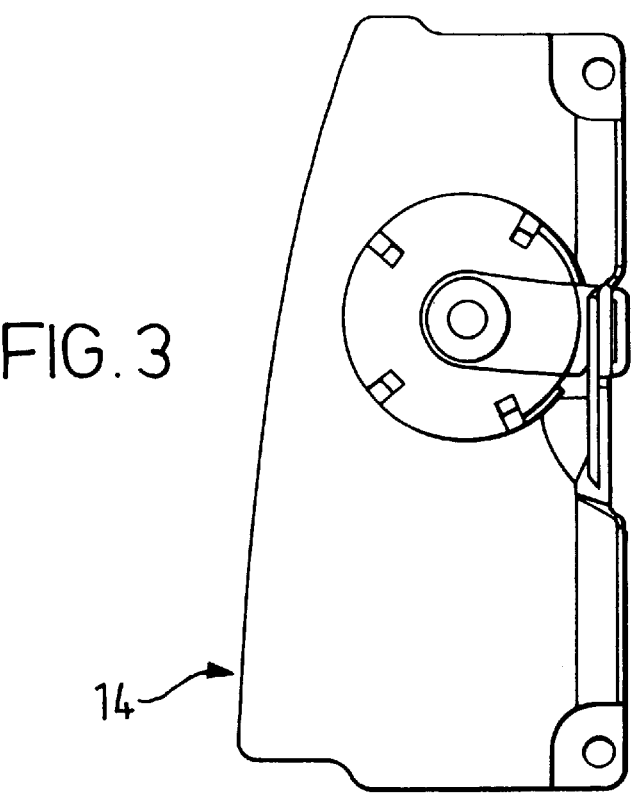
FIG. 3 is an underside plan view of the housing of FIGS. 1 and 2.
Figure 4:
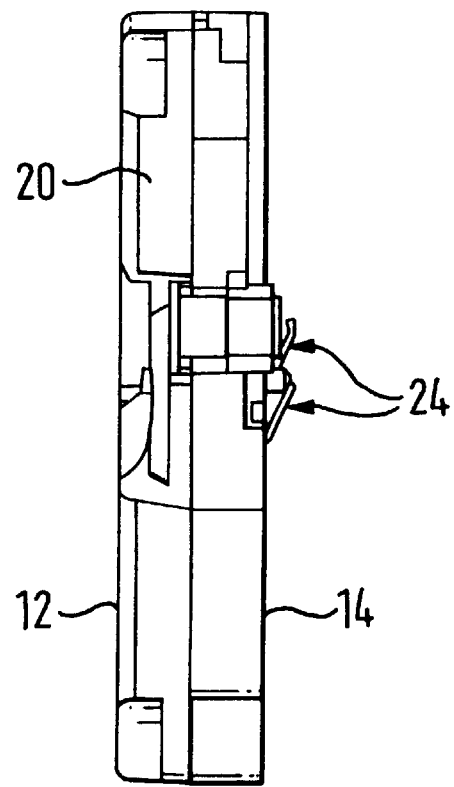
FIG. 4 is a side view of the housing of FIGS. 1 to 3.

As is apparent from FIGS. 1 and 2, the upper diaphragm holder (12) is constructed from a retaining plate (16) having formed therein an aperture (18) which is designed to receive an audio diaphragm (not shown). The retaining plate (16) is provided with an integrally formed continuous side wall (20) which extends around its perimeter.

To assist locating and fitting an audio diaphragm in the holder (12), the retaining plate (16) has a recess running around the circumference of the aperture (18) and forming a shoulder (22). During assembly, the audio diaphragm is located in the aperture (18) with a peripheral rim of the diaphragm locating against the shoulder (22). The audio diaphragm is fixed in place against the shoulder (22) e.g. by the use of adhesive. Some kind of gasket means could be used between the diaphragm and the shoulder (22) and of course between the diaphragm and the housing of the handset. The correct position and orientation of the diaphragm can be assured with one or several locating formations (23) included in the retaining plate (16) defining the circumference of the aperture. In this way, the positional relationship between the diaphragm and the housing can be fixed. This has the advantage that connectors between the diaphragm and the housing are accurately positioned. Such connectors are described below.

The construction of the lower diaphragm holder (14) is broadly similar to that of the upper diaphragm holder (12) and will not therefore be described in detail. Suffice to say that the lower holder (14) is dimensionally substantially equivalent to the upper holder (12), save that the aperture (18') is in a different position.

To form a housing (10), the upper and lower diaphragm holders (12,14) are brought together in a back-to-back configuration so that respective retaining plates oppose one another with their apertures facing outwardly.

With the two retaining plates being substantially coterminous, their side walls are aligned so that when the two diaphragm holders are brought together they meet flush, as shown in the arrangement of FIG. 1. Where the side walls meet they are ultrasonically welded together thus improving air tightness of the connection between the two holders.

The chamber is sealed when the audio diaphragms are mounted in the apertures in respective retaining plates. The result is an air tight housing for carrying two audio diaphragms. In addition to the improvement in output quality of each individual audio diaphragm, by having a sealed chamber for two diaphragms, the acoustic interference between one diaphragm and another is thereby substantially reduced. As mentioned earlier in this specification, by controlling the volume of air enclosed in the housing, it is possible to improve the acoustic response. The design of the chamber can be determined depending on the diaphragm and its requirements of output level.

There may of course be such implementations where the chamber is not designed for accommodating two diaphragms which are provided in the handset but simply the one. For example when the audio quality of one transducer is more critical than that of another diaphragm. Of course the acoustic effect between the two diaphragms can still be reduced. Furthermore, when the acoustic effect of one diaphragm is likely to have a serious impact on another diaphragm, the two should not be mounted in one housing having a single chamber.

Figure 5:
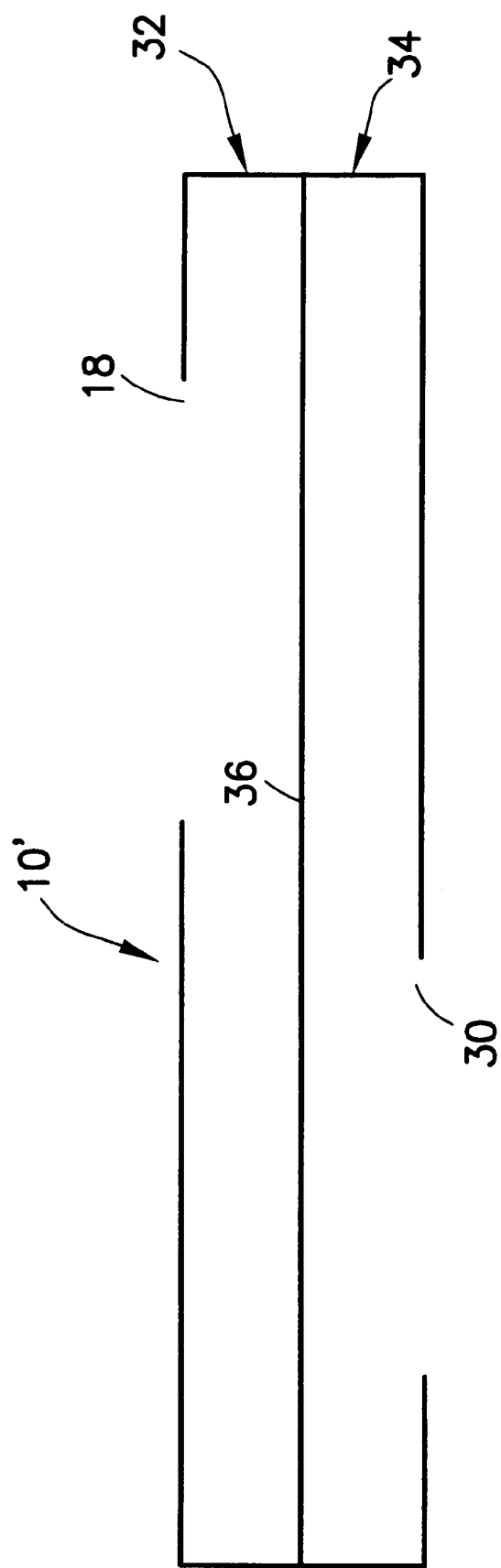
FIG. 5 is a schematic side view of a housing having a separating wall.

It should be appreciated that instead of the upper and lower holders 12 and 14 coming together to form a housing with one acoustic cavity, each of the holders can be a unitary housing 32 and 34 as in FIG. 5 so that when they are joined together there are two separated acoustic chambers/cavities. In other words, the two holders 32 and 34 forming the housing 10' provide separate acoustical rear spaces for both the diaphragms. This could also be achieved by a single wall 36 separating the upper and lower holders. The separating wall 36 could be included as a backplate on one of the holders, or as a backplate dosing off one of the apertures.

It is useful to provide on the housing formations for connecting the housing, and indeed the audio diaphragm itself, to other components in the handset. For instance the housing may be provided with electrical connectors in the form of spring contacts (24) for electrically coupling an audio diaphragm to a printed circuit board. Other connecting means can also be used. For example an elastomer connector (25) is provided as an alternative way to couple the housing to the printed circuit board.

One advantageous way to reduce the size of the radio telephone handset could be to use a cover of the device as one of the retaining plates of the housing. In one arrangement the upper holder's outward facing surface is formed by the upper cover of the handset, and the lower holder's outward facing surface is formed by the lower cover of the handset. In this case the diaphragms could be placed in the housing before ultrasonically welding together the two holders. The electrical connections (25, 25) could then be located for example on the side wall (20) for ease of assembly.

Mobile telephones operating in a cellular radio network have become common and widely used personal communication devices. In addition to the conventional telephone functions, mobile phones are being equipped with a greater variety of functions diversifying both the telecommunication in itself and the use of mobile phones in connection with the telecommunication or as addition for required peripheral functions. One example of this new kind of a personal communication device is the Applicant's N9000 Communicator (Trade Mark) type of device, which is a relatively small, portable device having both Personal Digital Assistant (PDA) functions as well as the Cellular Mobile Telephone (CMT) functions. The invention described in this application is particularly advantageous in this kind of device having e.g. different user interfaces and multiple functions and possibly several audio diaphragms for different purposes. For example one audio diaphragm such a hands-free speaker could be retained in one holder of the housing and a further audio diaphragm such an earpiece could be mounted in another co-joining holder of the housing, or in a completely separate housing, or if it has diminishing acoustic properties as compared to the hands-free speaker it could be mounted elsewhere in the handset.

Radio telephone handsets in this specification thus covers also these kinds of portable terminal devices.

The present invention may be embodied in other specific forms without departing from the essential attributes thereof. Accordingly, reference should be made to the appended claims rather than the foregoing specific description as indicating the scope of the invention.

Furthermore, each feature disclosed in this specification and/or shown in the drawings may be incorporated in the invention independently of other disclosed and/or illustrated features.

The abstract as filed herewith is included in the specification by reference.

What is claimed is:

1. A radio telephone handset including a housing for retaining two or more audio diaphragm means, the housing having two or more apertures therein respectively for receiving the two or more diaphragm means, the housing having at least one internal separation wall such that each of the two or more diaphragm means cooperates with the housing to define respective substantially sealed chambers, the arrangement being such that respective inward faces of the two or more audio diaphragm means are enclosed by the substantially sealed chambers thereby substantially acoustically isolating the inward faces from outward faces of the respective diaphragm means, and substantially acoustically isolating the respective inward faces of said two or more audio diaphragm means from one another.

2. A radio telephone handset according to claim 1, wherein the housing is formed from two or more diaphragm holders each holder providing one of said two or more apertures.

3. A radio telephone handset according to claim 2, wherein the two or more diaphragm holders are ultrasonically welded together.

4. A radio telephone handset according to claim 1, wherein the housing is provided with formations for engaging with other components of the handset.

5. A radio telephone handset according to claim 4, wherein said formation comprises electrical connectors for connecting the audio diaphragm means to a printed circuit board.

6. A radio telephone handset according to claim 1, wherein the audio diaphragm means comprises a speaker transducer, the arrangement being such that in use sound waves produced by an inward face of the speaker transducer are enclosed within the sealed chamber thereby substantially acoustically isolating said sound waves from sound waves produced by an outward face of the speaker transducer.

7. A radio telephone handset according to claim 1, wherein the housing is a unitary component.

8. A radio telephone handset according to claim 1, wherein one or more walls of the housing are provided by one or more walls of the handset.

9. A radio telephone handset according to claim 1, wherein a further audio diaphragm means is provided spaced from the housing.

10. A radio telephone handset according to claim 9, wherein the audio diaphragm means retained in the housing is a hands-free speaker and the further audio diaphragm means is an earpiece.

* * * * *